(12) United States Patent
Weng (10) Patent No.: US 7,251,621 B1
(45) Date of Patent: Jul. 31, 2007

(54) METHOD AND APPARATUS FOR THE HOME DELIVERY OF LOCAL RETAIL E-COMMERCE ORDERS

(76) Inventor: Weiwen Weng, 1229 Pennyroyal Ter., Sunnyvale, CA (US) 94087

( * ) Notice: Subject to any disclaimer, the term of this patent is extended or adjusted under 35 U.S.C. 154(b) by 0 days.

(21) Appl. No.: 11/617,989

(22) Filed: Dec. 29, 2006

Related U.S. Application Data (63) Continuation-in-part of application No. 11/307,379, filed on Feb. 3, 2006.

(51) Int. Cl.
G06Q 30/00 (2006.01)

(52) U.S. Cl. .......................................... 705/26; 705/37

(58) Field of Classification Search ................... 705/26
See application file for complete search history.

(56) References Cited

U.S. PATENT DOCUMENTS

| | | | |
|---|---|---|---|
| 2002/0156645 A1 * | 10/2002 | Hansen | 705/1 |
| 2003/0115104 A1 | 6/2003 | Smith et al. | |
| 2003/0171996 A1 | 9/2003 | Chen et al. | |
| 2005/0137935 A1 | 6/2005 | Lee | |

FOREIGN PATENT DOCUMENTS

| | | | |
|---|---|---|---|
| JP | 2001-306857 A | * | 11/2002 |
| WO | WO-0205177 A1 | | 1/2002 |

OTHER PUBLICATIONS

Elder, Robert, Venture cash to help UShip keep moving, American-Statesman Staff. Austin American Statesman. Austin, Tex.: Jun. 24, 2005. p. C.1, 2 pages, downloaded from ProQuest Direct on the Internet on Apr. 10, 2007, 2 pages.*

Stowe, Gene, Like pizza, award-winning business can deliver toner-Fast, Tribune Business Weekly. South Bend: Aug. 29, 2005, vol. 16, Iss. 18; p. 3, downloaded from ProQuest Direct on the Internet on Apr. 10, 2007, 2 pages.*

Greig, Jane, Move it out even if it's not a truckload American-Statesman Staff, Austin American Statesman, Austin, Tex., Sep. 28, 2004, p. E.1, downloaded from ProQuest Direct on the Internet on Apr. 10, 2007, 2 pages.*

11_617989_$_NOTES_PriorArt_Screens.doc, 6 pages, created by Examiner, includes web pages for www.uship.com and www.licketyship.com.*

* cited by examiner

Primary Examiner—James Zurita
(74) Attorney, Agent, or Firm—O'Connor & Company; Ryan O'Connor (57) ABSTRACT

The method and apparatus disclosed herein empowers the general population to deliver e-commerce orders from retail stores to buyers. Embodiments of the invention reduce overall fuel usage, creating value for all members of the value chain: reduction in delivery fees for buyer, higher customer satisfaction and purchasing of goods for retailers, and the ability to earn extra income for patrons that deliver the orders. The method and apparatus comprise a database of patrons to perform home or local delivery of e-commerce orders, a database of e-commerce orders from stores, a database of buyers who place the orders, and computer instructions to match acceptable orders with patrons.

19 Claims, 3 Drawing Sheets

METHOD AND APPARATUS FOR THE HOME DELIVERY OF LOCAL RETAIL E-COMMERCE ORDERS

STATEMENT OF PRIORITY

This continuation-in-part application claims priority under 35 U.S.C. 120 from U.S. patent application Ser. No. 11/307,379 for "Method and Apparatus for the Home Delivery of Local Retail E-Commerce Order" (W. Weng) filed on Feb. 3, 2006, which is incorporated herein by reference for all purposes.

FIELD OF THE INVENTION

The present invention relates to a method and apparatus that enables efficient home delivery of local retail e-commerce orders. More particularly, the invention relates to a method and apparatus that empowers members of the general population to deliver orders from a retail store to buyers in a more cost-effective way than conventional home-delivery services.

BACKGROUND OF THE INVENTION

Internet-based retail sales have become a mainstay in the continued growth of electronic commerce, according to the U.S. Department of Commerce Census Bureau (E. Rabinovich, *Journal of Business Logistics* 26:1, 2005). Electronic commerce via the internet is rapidly changing the way in which products are purchased by and delivered to consumers. An important challenge faced by most businesses engaging in commerce over the Internet (or by telephone or mail order) relates to the manner in which their products actually get to consumers.

Most internet retailers rely on third-party services such as UPS and Federal Express to deliver the products purchased on their web sites. This model has some advantages for the retailers, because they can utilize professional delivery companies rather than investing in and developing their own delivery infrastructures.

However, as is well-known, the delivery cost to the consumer can be quite high. High delivery costs can cause would-be buyers to cancel orders or otherwise purchase less from a retailer, which obviously hurts the retailer economically (provided the particular has a profitable business on each marginal order).

Many consumers greatly value the opportunity cost of their time and prefer the convenience of online shopping, saving a trip to a physical store. Some consumers, on the other hand, do prefer to shop at a "real" store, for example, to be able to see products before purchasing, or because they enjoy the shopping experience. Some consumers, furthermore, would welcome opportunities for extra income on a regular basis by delivering orders from the store in which they are shopping, or nearby stores, to online shoppers who live in close proximity.

From an environmental standpoint, current delivery methods for retail orders can have a high cost. Fuel is wasted when product delivery routes are longer or less efficient than they need to be. Low product-delivery efficiencies can be caused, for example, when goods are transported across the country from a warehouse to a consumer, rather than from a local store that stocks the item.

It is widely recognized that energy is one of the most critical challenges facing humans in the 21st century. One area of particular importance is reducing the high consumption of liquid fuels, such as gasoline and diesel fuel, derived from petroleum. A significant percentage of transportation fuel usage—and associated emissions—is due to inefficiencies during delivery of retail goods.

Based on these known limitations, consumers and retailers would benefit from a delivery method, service, and apparatus that can provide delivery of goods at a lower cost, compared to what is commercially available today. There also exists a desire in the marketplace for improved delivery methods that can reduce overall fuel usage and road congestion, and thereby benefit the environment and quality of life.

What is therefore needed is a method and apparatus to match the supply and demand of the delivery system in an efficient manner. Namely, persons seeking extra income need to be matched with persons preferring the convenience of online shopping. In a preferred system, the reduction in fuel usage could translate into value creation for all members of the value chain: reduction in delivery fees for buyers, higher customer satisfaction and purchasing of goods for retailers, and the ability to earn extra income for delivers.

SUMMARY OF THE INVENTION

The present invention comprises a method of empowering a patron to deliver at least one e-commerce order to one or more buyers. The method matches at least one pending e-commerce order with a patron's acceptable delivery criteria, and manages the delivery transaction and compensation. The delivery criteria can include the criterion that the additional distance of travel required by the deviation is less than a preset limit, or that the additional time of travel required by the deviation is less than a preset limit, for example. Other delivery criteria can relate to the total weight or volume of the goods, or other parameters associated with the goods.

In some preferred embodiments, the method further comprises the following steps:

(i) providing a user interface to allow the patron to create a valid account by choosing a user name and a password;

(ii) providing a user interface to allow the patron to specify acceptable delivery criteria;

(iii) presenting a service agreement between the patron and the service provider, wherein the service agreement can be acknowledged by the patron;

(iv) verifying the legal eligibility of the patron to participate in the method of claim 1; and (v) adding the information provided by the patron in steps (ii)-(iv) to a database.

In other preferred embodiments, the method comprises the following steps:

(i) providing a user interface to allow the patron to login;

(ii) retrieving patron's acceptable delivery criteria;

(iii) retrieving one or more pending orders;

(iv) applying patron's delivery criteria to filter the pending orders in substep (iii);

(v) providing a user interface to present to the patron the orders, if any, that satisfy the patron's delivery criteria;

(vi) providing a user interface to allow the patron to accept or decline the order or orders from substep (v);

(vii) when at least one order is accepted in substep (vi), providing a user interface to communicate to the patron the set of order or orders to deliver, driving directions and/or a map, and estimated travel time.

In still other preferred embodiments, the method comprises the following steps:

(i) creating a record in a database upon receiving of the order, with an indication that the order is not yet packaged;

(ii) updating the order status to indicate it is packaged, upon completion of order packaging;

(iii) updating the order status to indicate that it has been selected by a patron to deliver, upon patron's confirmation;

(iv) updating the order status to indicate that the order has been carried out of a store and is being delivered;

(v) adding a delivery fee to the patron's account; and (vi) updating the order status to indicate it has been delivered, thereby closing the transaction.

Some embodiments of the invention comprise the steps of:

(i) creating a record in a database upon receiving of the order;

(ii) indicating to the buyer that the order is authorized to be picked up by a patron;

(iii) providing means for potential patrons to view the pending order;

(iv) providing means for a patron to select the order for delivery by the patron;

(v) updating the order status to indicate it has been delivered to the buyer; and (vi) adding a delivery fee to the patron's account.

Certain embodiments comprise the following method steps:

(i) providing a user interface to the buyer to show whether delivery by a patron is available to buyer's address;

(ii) when delivery by a potential patron is available, presenting a service agreement to the buyer;

(iii) providing a user interface to the buyer to allow the buyer to input acceptable patron criteria;

(iv) calculating a delivery fee based on buyer-specified patron criteria; and (v) adding information obtained from substeps (i)-(iv) into a database.

The acceptable patron criteria of step (iii) can specify a minimum number of deliveries performed by the patron over a certain time period, or a minimum percentage of positive feedback scores of the patron, for example. The feedback can be collected from stored data on a server of the invention, or can be feedback according to a third-party ratings system, or any other method of obtaining feedback regarding a potential patron. The acceptable patron criteria of step (iii) can also specify that the patron is within a certain number of people connections to the buyer, which helps build a network of trust.

In preferred embodiments of the invention, a patron delivers orders to two or more buyers, wherein each order meets the patron's acceptable order criteria and each buyer meets the patron's acceptable deviation criteria, and wherein the set of orders as a whole meets the patron's acceptable delivery criteria. Overall system efficiencies generally increase, and the invention is particularly advantageous, when patrons deliver a plurality of e-commerce orders placed by a plurality of buyers, wherein a plurality is 2, 3, 4, 5, 6, 7, 8, 9, 10, or more than 10 orders and/or buyers.

The invention also comprises methods of selling one or more products and delivering the products to a buyer, the method comprising:

(a) providing the one or more products;

(b) providing means for electronically purchasing the product(s) by the buyer;

(c) providing the option of delivery by a patron to the buyer;

(d) providing means for determining at least one potential patron for delivery of the product(s) to the buyer;

(e) providing means for determining, for each potential patron, the delivery deviation associated with the buyer;

(f) providing means for comparing the delivery deviation from step (e) with acceptable deviation criteria of each potential patron; and (g) if at least one patron is associated with deviation criteria that is acceptable, providing means for selecting one patron, authorizing the delivery transaction, and compensating said patron for delivery of the product(s) to the buyer.

Various embodiments of methods of selling one or more products and delivering the products to a buyer, include one or more of the following steps, in various orders:

providing a user interface to allow the patron to create a valid account by choosing a user name and a password;

providing a user interface to allow the patron to specify acceptable delivery criteria; presenting a service agreement to the patron;

verifying the legal eligibility of the patron to deliver the product(s);

adding the information provided by the patron to a database;

providing a user interface to allow the patron to login; retrieving patron's acceptable delivery criteria;

retrieving one or more pending orders;

applying the patron's delivery criteria to filter pending orders;

providing a user interface to present to the patron the orders, if any, that satisfy the patron's delivery criteria;

providing a user interface to allow the patron to accept or decline the order or orders;

when at least one order is accepted, providing a user interface to communicate to the patron the set of order or orders to deliver, driving directions and/or a map, and estimated travel time;

providing a user interface to the buyer to show whether delivery by a potential patron is available to buyer's address;

when delivery by a potential patron is available, presenting a service agreement to the buyer;

providing a user interface to allow the buyer to input acceptable patron criteria;

calculating a delivery fee based on buyer-specified patron criteria;

creating a record in a database upon receiving of the order, with an indication that the order is not yet packaged;

updating the order status to indicate it is packaged, upon completion of order packaging;

updating the order status to indicate that it has been selected by a patron to deliver, upon patron's confirmation;

updating the order status to indicate that the order has been carried out of a store and is being delivered;

adding the delivery fee to the patron's account; and updating the order status to indicate it has been delivered, thereby closing the transaction.

The invention also comprises e-commerce systems for empowering a patron to deliver one or more e-commerce orders to at least one buyer, the system comprising:

(a) a client computer to present a user interface to perform the registering of a patron;

(b) a data-storage medium to store order information;

(c) a data-storage medium to store buyer information;

(d) a data-storage medium to store patron information;

(e) a data-storage medium to store transaction information; and (f) a client or server computer to perform calculations to match, if possible, at least one pending e-commerce order with the patron's acceptable delivery criteria, said acceptable delivery criteria including acceptable deviation criteria and acceptable order criteria. In some embodiments, the calculations in element (f) are executed substantially on the internet In some embodiments, one or more data-storage media of elements (b)-(e) are physically contained in a retail store in which the buyer places an order.

The invention also comprises a computer data signal embodied in a transmission medium, comprising code segments including instructions for carrying out one or more methods described herein.

BRIEF DESCRIPTION OF THE DRAWINGS

Non-limiting features and aspects of the present invention can be explained in the following description taken in connection with the accompanying drawings.

DETAILED DESCRIPTION OF THE INVENTION

In order to describe preferred embodiments of the present invention, the following definitions shall be applied.

By "buyer" is meant a customer who orders goods from a retail store via the internet or by telephone. A buyer does not ordinarily travel to the retail store.

By "patron" is meant a person who delivers acceptable orders from the retail store to one or more buyers residing within an acceptable deviation from the patron's original route. A patron travels to one or more retail stores.

"Route" means the path a person takes from one location to another by some means of transportation.

"Patron's original route" means the route a patron would have taken if the patron did not perform a delivery. By default, the patron's original route starts from the retail store and ends with the patron's home address.

"Acceptable delivery" means a delivery of an order that a patron deems acceptable. A delivery is considered acceptable if the order to be delivered is acceptable, and if the deviation from the original route required to make the delivery is also acceptable.

"Acceptable delivery criteria" means the criteria that must be met for a delivery to be considered acceptable. Acceptable delivery criteria include acceptable deviation criteria and acceptable order criteria.

"Deviation from patron's original route" means an additional route whereby the patron leaves the path defined by the patron's original route to reach an alternate destination or set of destinations, arrives at that destination or set of destinations in sequence, and then rejoins the path defined by the patron's original route.

"Acceptable deviation from patron's original route" means the deviation from patron's original route that a patron deems acceptable. Acceptability of a potential deviation from an original route is determined by a set of acceptable deviation criteria imposed by the patron.

"Acceptable deviation criteria" means the criteria that must be met for a deviation from patron's original route to be considered acceptable. In some exemplary embodiments of the invention, acceptable deviation criteria include constraints that the additional distance of travel required by the deviation be less than 1 mile, or that the additional time of travel required by the deviation be less than 5 minutes.

"Acceptable order" means an order (of commerce) that a patron deems acceptable to deliver, not taking into account the deviation from the patron's original route that will be needed to deliver the order. Acceptability of an order is determined by a set of acceptable order criteria imposed by the patron.

"Acceptable order criteria" means the criteria that must be met for an order to be acceptable. In some exemplary embodiments of the invention, acceptable order criteria include that the total weight of the goods in the order be less than about 20 pounds, or that the total number of bags in the order be less than 3.

"Acceptable patron" means a patron that a buyer deems an acceptable choice to deliver the buyer's pending order to the buyer's home or other specified destination. Acceptability of a patron is determined by a set of acceptable patron criteria imposed by the buyer.

"Acceptable patron criteria" means the criteria that must be met for a patron to be acceptable. In some exemplary embodiments of the invention, acceptable patron criteria include that the number of deliveries performed by the patron in the past year be more than 10 or that the patron has received positive feedback. A specific example of acceptable patron criteria, relating to positive feedback, could utilize third-party ratings system for commerce, such as is known, for example, according to the system at http://www.rapleaf.com. Other types of acceptable patron criteria could specify certain degrees of connection between buyer and patron, such as is known, for example, according to the system at http://www.linkedin.com or similar web sites. As an example, a buyer could specify that a patron must be within three degrees of connection to the buyer, or some other parameter related to a network or people.

By "cost of travel" is meant the cost incurred by driving a vehicle, including the cost of fuel and oil, vehicle deprecation, vehicle insurance and registration, and travel time.

"Total travel cost of a delivery" means the cost of total travel for a patron to make in order to deliver one or more orders to one or more buyers.

"True travel cost of a delivery" means the cost of travel for a patron to deliver one or more orders to one or more buyers, excluding the cost of travel of the patron's original route. The true travel cost is the summation of the cost of travel of the one or more deviations from the patron's original route.

A "pending order" means an order that has been placed by a buyer and selected for delivery by a method of the present invention, but for which no patron has yet selected the order for delivery. The order is pending for delivery, not pending with the retailer.

"Local" as used throughout the present description refers to a delivery distance for a patron to deliver an order or orders to one or more buyers. The term is used to illustrate various advantages and embodiments of the invention, but is not to be construed as limiting the scope in any way. In preferred embodiments, "local" can be taken to mean a network of sellers, buyers, and patrons within about 50 miles of a center of population or commerce. In some concentrated cities, "local" could be construed as a network characterized by a smaller length scale, such as 25 miles, 10 miles, or even a short as a mile or less.

In general, the methods and the apparatus of the invention can be applied for the distribution of retail or wholesale purchases in any category of commerce. Representative examples of electronic goods, for example, that can be delivered include computers and computer equipment, TVs, DVD players and recorders, CDs, camcorders, audio equipment, stereo systems, monitors, software, cameras, small appliances, and video games.

The invention is by no means limited to delivery of electronic goods. Some other classes of goods that can be delivered include bed and bath accessories, kitchen accessories, large appliances, lawn equipment, furniture, toys, food (including ready-to-eat meals and groceries), books, baby accessories, and clothing. Any item that can be purchased by means of e-commerce, and can be delivered by a patron to a buyer, can be delivered by embodiments of the invention. There is no limitation on the nature of the goods. Namely, items to be delivered can be of any size, weight, volume, shape and center of gravity, color, material of construction, and so on, provided that the order meets the patron's acceptable delivery criteria.

In some embodiments of the invention, a buyer first places an online order using a retail store's ordering system. The buyer could also place the order by telephone, by e-mail, by text message, or by causing another person to perform steps leading to an order being placed. The retail store packages the order. In parallel, the order information is sent to a server. As soon as the order has been packaged, the server makes the order available for delivery by a patron. A patron chooses the order for delivery and travels to the retail store, fulfills his/her own shopping needs if desired, collects the order using the store's in-store pickup service or by other means, and then delivers the order, thus closing the transaction.

In some embodiments, a server of the invention is not integrated with one or more retailers. For these embodiments, after a buyer places an online order, the buyer manually sends data to a server of the invention, wherein the data include order information that can be matched with potential patrons. The buyer can manually send the order data in a number of well-known ways, such as by e-mail, by phone, by entering information on a web site linked to the server, and so on. The buyer can choose to send the order data immediately after placing the order, after receiving confirmation from the store that the order was accepted, after receiving notification from the store that the order is ready to be picked up, or at any later point in time.

One function of the server is to match pending orders from buyers to a patron who will deliver those orders. The server computer will generally be programmed to find all of the acceptable orders for which an acceptable deviation from a patron's original route exists to get to the delivery location of each individual order. A patron can then choose which of these matching orders to deliver, if any, after which the server computer will calculate the optimal route deviation the patron could take to reach all of the destinations.

By "optimal route deviation" is meant a deviation that best adheres to the acceptable deviation criteria established by the patron, and further that minimizes true travel cost for the patron. For example, if the patron has set one criterion to be that any destination must be within a three-mile radius of some point on his/her original route, the server computer will construct and communicate deviations that never go beyond three miles of the patron's original route and come as close to the original route as possible.

One advantage of the service embodied in preferred embodiments, over conventional home-delivery services, is the reduction in true travel cost. The total travel cost for a patron to perform a delivery is the sum of the following:

(i) the cost of travel of patron's original route; and (ii) the true travel cost, which is the cost of travel of the deviations from the patron's original route.

The cost of the original route (i) is a sunk cost that has been incurred. The true travel cost to the patron (ii) can be less than the total travel cost required by a conventional delivery service, leading to economic advantages to a buyer and therefore to a retailer.

A lower true travel cost per delivery allows the delivery fee to be reduced, in preferred embodiments. Customers who are pressed for time or who tend to avoid in-person shopping can enjoy the convenience of online shopping and a relatively low delivery fee.

A low delivery fee is also an advantage for the retail store. It can increase online sales and make a retail store more efficient by letting it serve a larger neighborhood, as some of the customers do not need to travel to the store. Also, the availability of a low-cost delivery service can be a tremendous competitive advantage in the retail industry. In some embodiments, retailers could absorb the patron fees into the cost of goods sold, with no delivery fee charged to buyers. In other embodiments, retailers could for example sell delivery memberships with an annual fee but little or no per-delivery fees. Other variations of structuring delivery fees to buyers are well-known in commerce.

In preferred embodiments, with relatively small effort patrons can make deliveries and receive compensation. Therefore, the delivery methods of the invention can be attractive to members of the general population, who may not otherwise be interested in providing delivery services, to participate as patrons.

In other embodiments, professional delivery companies and local couriers can participate as patrons in the methods of the invention, with similar advantages to both buyer and retailer. Delivery professionals could attempt to augment their previously scheduled deliveries on similar routes, by selecting at least one pending order from a server, for delivery to a buyer.

In related embodiments, a local courier service person, a delivery professional, or a person that would like to compete with delivery professionals or couriers, could perform deliveries selected from various pending orders described on a server. In one particular such embodiment, the start and end point of a specific set of deliveries could be a store, rather than a residential address which is a typical end point for a patron. Preferably, the server will generate optimized routes that contain multiple orders to be delivered with the least average cost of delivery.

The local courier service person, delivery professional, or person that would like to compete with delivery professionals or couriers, could perform patron-to-buyer deliveries exclusively selected from the server of the invention. In other embodiments, the patron's total route would comprise both patron-to-buyer deliveries as well as other non-related deliveries, pick-ups, errands, and the like.

In embodiments characterized by a patron performing a plurality of deliveries from a store, and then returning to the same store, the "patron's original route"—defined above as the route a patron would have taken if the patron did not perform a delivery—is the special case of no travel at all. The definition of "deviation from patron's original route" still applies, wherein for these embodiments the entire route is essentially a deviation. Furthermore, the true travel cost and total travel cost are the same. Such a patron could utilize dynamic information on buyers and orders stored on a server, as well as instant route optimization. For example, when the patron finishes a given route and is ready to deliver another round of orders, the patron could access the server and select orders to deliver from a database that is practically instantaneously updated. Accessing the server in real time could be done by an in-store kiosk or computer, if available, or by the patron's mobile-phone or other hand-held internet connection. The patron could also dynamically adjust acceptable delivery criteria, including deviation criteria and order criteria, if the patron so chooses.

Other embodiments are characterized by a patron performing a plurality of deliveries from at least two stores. In the case of two stores, a first store being a starting point and a second store being an end point, "patron's original route" is a reasonably direct route between the first and second stores, from which deviations are calculated by a server for patron delivery of orders. The second store can, of course, be a starting point for a new round of deliveries for the patron.

It is envisioned that a patron or team of patrons could serve a network of local stores in this manner, and the number of stores and deliveries is not limited by the scope of the present invention. It is further envisioned that a plurality of retail stores in reasonable proximity could benefit from the methods and apparatus of the invention, by sharing and taking advantage of a common pool of patrons.

For efficiency reasons, routes taken by patrons (regardless of number of stores) would preferably comprise delivering at least 2, more preferably at least 3, still more preferably at least 4, and most preferably at least 5 or more orders.

In some embodiments, a service guarantee can be provided, relating for example to delivery of the order within a scheduled delivery time. Methods in which a service guarantee could be executed include hiring a local courier for dedicated delivery, or retaining one or a plurality of in-store delivery persons that can deliver orders not otherwise selected by a patron. In certain embodiments, such a service guarantee could be limited to areas with high population density, which increases the likelihood of matching orders to be delivered to this area with patrons who have restrictive delivery criteria.

In some embodiments of the invention, potential compensation to patrons can be dynamically increased to accelerate delivery of pending orders. An increase of compensation may be sufficient to convince patrons to relax their acceptable delivery criteria and accept a wider range of orders to deliver.

In general, a potential patron's delivery criteria are dynamic and can be adjusted at any time so that a patron can decide to deliver one or more orders. For the purpose of the present invention, if a patron delivers an order, then that order is deemed to be de facto acceptable to the patron, even if the characteristics of the delivery route, the nature of the goods, and/or the buyer are such that it would appear that the order did not, or does not, in fact meet the patron's acceptable delivery criteria according to the data stored on a server.

In some embodiments, the methods and apparatus of the invention are practiced within the control of a retail store. A retailer could set up one or more systems within their stores so that customers can become patrons for orders placed by e-commerce buyers of goods sold by the retailer. A retailer could use various means to enable customers to become patrons, such as in-store kiosks; in-store workstations; in-store computers with internet connections; information booths, such as those typically used for performing actions such as viewing a gift registry; or any other electronic means of connecting with a server storing a database of information on buyers, orders, patrons, and transactions. A server itself could be onsite at a retailer or could be offsite at a central location, or distributed in some fashion, as is well-known in the art.

In general, a patron can receive information pertaining to one or more orders for potential delivery either actively or passively, and through a wide variety of communication means. In certain embodiments, a patron can choose to receive notification (such as by e-mail or text message on a cellular phone) when a buyer places an order that tends to match, or comes close to matching, the patron's pre-existing delivery criteria. In other embodiments, a potential patron could be notified of available orders that match his/her delivery criteria when he/she is checking out. A customer could first learn of the service while checking out, and subsequently register (i.e., become a patron), receive order information, and deliver one or more orders to buyers, en route home.

Various embodiments of the invention can be further described according to the figures contained herein. The figures are understood to provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein. Generally, system parameters and constraints will be chosen to establish an economical business operation; parameters and constraints will sometimes need to be varied, depending on the desired overall efficiency or the desired profitability, for example. Those skilled in the art can readily perform such manipulations of the business process disclosed and taught herein, without undue experimentation.

Figure 1:
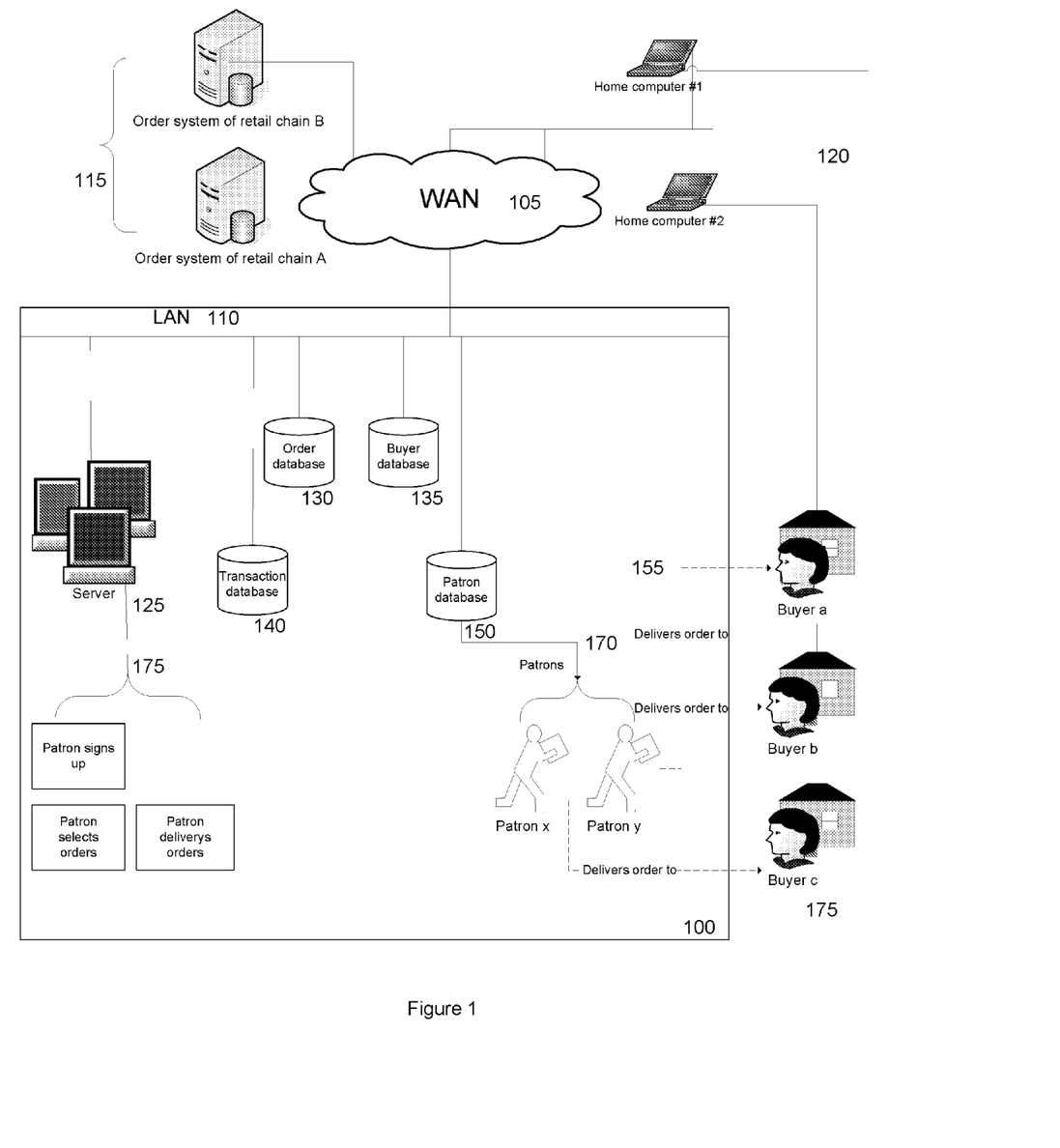
FIG. 1 is an exemplary component diagram of one embodiment of the methods and apparatus of the invention.

FIG. 1 is an exemplary component diagram of the system 100, which is a system of one embodiment of the invention. The system 100 connects to the order system 115 of the retail stores, and to a buyer or patron's home computer 120 through a wide area network (WAN) 105, such as the internet A user interface is integrated into the existing ordering interface (web site) provided by the ordering system 115, thereby giving a buyer or patron access to the service.

The system 100 comprises the server 125, an order database 130, a buyer database 135, transaction database 140, a patron database 150, and the patrons 170. The server 125, order database 130, buyer database 135, patron database 150, and transaction database 140 are connected through a local area network (LAN) 110.

The server 125 stores data in, and retrieves data from, the plurality of databases, and is responsible for substantially all manipulation of this data. Orders placed through the ordering systems 115 of the retail stores are received by the server 125 and are then stored in the order database 130. Patron information is stored in the patron database 150 when a patron creates a new account, updates acceptable delivery criteria, or other actions. Buyer information is stored in the buyer database 135 when a buyer chooses to have an order delivered through the service. Transactions are entered into the transaction database 140 for each order to be delivered by a patron.

Figure 2:
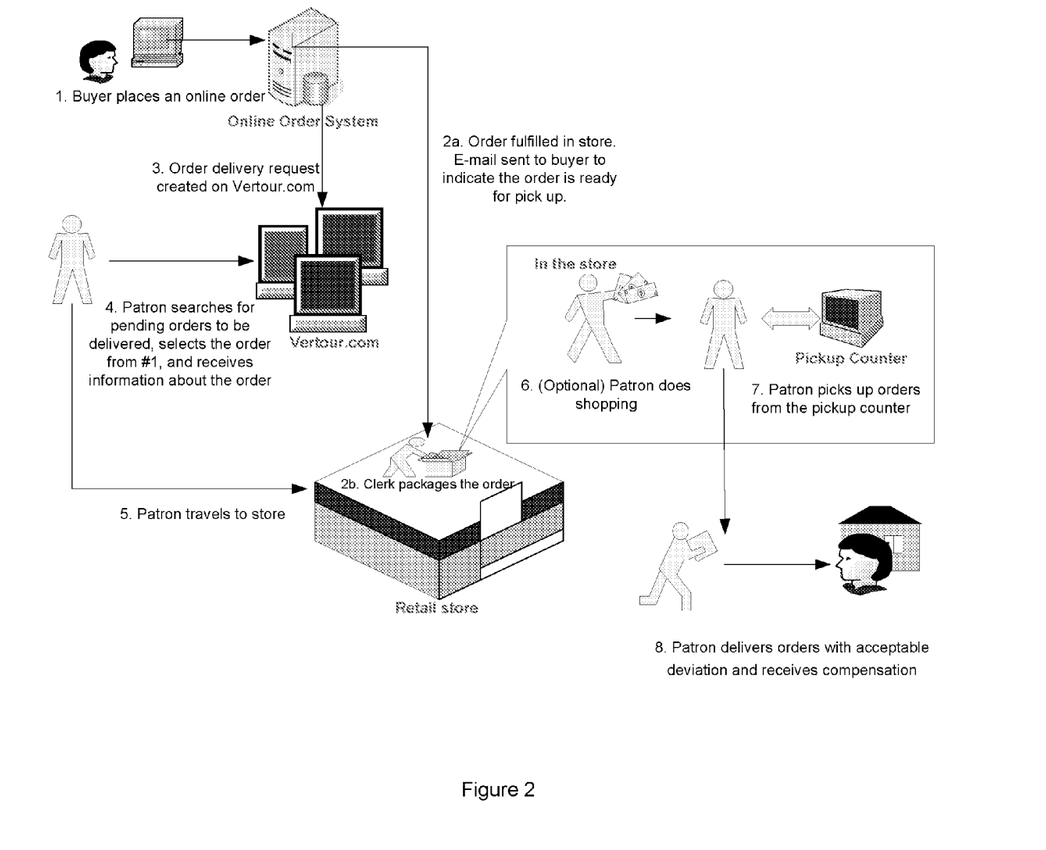
FIG. 2 is an exemplary component diagram of one embodiment of the methods and apparatus of the invention.

FIG. 2 illustrates one preferred method and apparatus embodied by the invention. In this particular embodiment, a buyer places an online order using the online order system of a retailer. The order is fulfilled and packaged in a local store, and an e-mail is sent to the buyer to indicate that the order is ready for pick-up. Meanwhile, an order delivery request is created online by the buyer, in order to utilize the method of the present invention. Sometime after the request, at least one patron searches pending orders to be delivered, and selects at least the order that was initially placed by the buyer online, as well as other orders in some cases. The patron is then given, and receives, information about the orders and routes for delivery, from the server (which in this embodiment is comprised of the internet site Vertour.com). The patron proceeds to travel to the retail store or stores that fulfilled (or will fulfill) the order or orders. The patron may do some shopping if desired, before or after picking up the pending order or orders from a pickup counter or similar means for gathering the packaged order. Finally, the patron delivers the orders and receives compensation.

Figure 3:
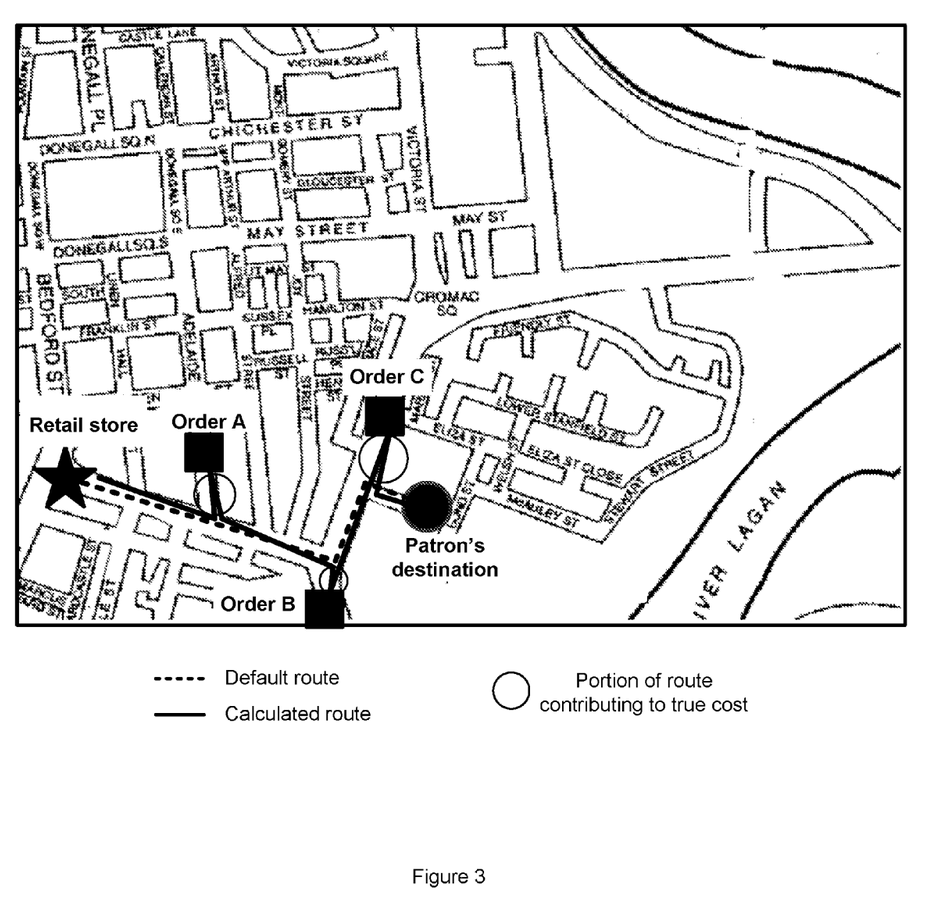
FIG. 3 illustrates an example of the travel and delivery efficiency of the methods and apparatus of the invention.

FIG. 3 illustrates an example of the delivery and transportation efficiency of preferred embodiments of the invention. The map in FIG. 3 shows a patron's original (default) route, which for the purpose of this example would be taken in the absence of the invention. This default route is shown on the map as a dotted line. The retail store is indicated by a star, and the patron's destination is indicated by a solid circle. The map shows the locations (indicated by solid boxes) of three orders (indicated by Orders A, B, and C) to be delivered by the patron, en route to the patron's destination. The recommended route for the patron or potential patron, as calculated by a server, is shown by a solid line. Parameters associated with the delivery, such as total deviation cost of the delivery, are calculated by a server and compared to the patron's or potential patron's acceptable delivery criteria, including acceptable deviation criteria.

The portions of the route that would contribute to the true cost of travel are approximately indicated by open circles. The original route the patron would take from the retail store to the final destination is a sunk cost, because it is the route the patron would take regardless of his/her participation in the system and method of the present invention. The real cost (or deviation cost) incurred by the small travel deviations necessary to actually deliver Orders A, B, and C should be less than the cost of the entire route.

FIG. 3 is intended to illustrate one non-limiting way in which travel routes and deviations can be calculated. Many other types of deviations are possible, including for example a route that comprises a deviation departing from the original route at a first point, taking the patron along a different route to deliver one or more orders, and then rejoining the original route at a second point. When there are multiple deliveries to be made, the complexity of the route can increase, as a function of local conditions and street layout, the distances between orders and length of deviations, and so on. There can be a large number of possible solutions to a given route and given number of orders to be delivered, but in preferred embodiments, the route is optimized, according to calculations performed on a computer, to minimize the true travel cost for the patron and to best meet the delivery criteria imposed by the patron. A patron might, for any reason, not be satisfied with the computer-generated route, and in some embodiments the computer can generate a plurality of recommended or preferred routes. A patron could still be unsatisfied with the computer-generated recommendations and either specify different delivery criteria on the fly, thereby allowing the computer to generate a new route or routes; or, the patron could simply follow a different route to deliver the orders, wherein the different route is nevertheless characterized by a lower true travel cost than would be incurred if the method of the invention was not practiced by the buyer or buyers.

In some embodiments, the delivery is an attended delivery, wherein the patron confronts the buyer with the order. For attended deliveries, the buyer can inspect the order to verify it is complete, accurate, and undamaged. In other embodiments, the delivery is an unattended delivery, wherein the patron leaves the order at the buyer's location. The buyer's location will normally be a home address, but it could be a place of business or any other location. Preferably, a specific location for placement of the order is specified by the buyer during the ordering process. Such specific locations for delivery could include, for example, inside a door box, at a back door, on or near a deck, on a driveway, near a garage door, on front steps, on back steps, near a mailbox, between a first and second door, inside a porch, and the like. In a certain embodiment, a drop box could be utilized, wherein the drop box could be larger than a typical mail box and could be customized in various ways to suit the user.

Some embodiments can further include means for the buyer and/or patron to send data to a server to indicate that the order has been delivered. Ways in which attended or unattended delivery verification can be achieved by the buyer include, for example, the buyer sending an e-mail, entering data on the internet, or making a phone call to cause a server to accept data indicating the order has been delivered successfully. In the case of attended delivery, such communication with the server could be performed immediately after delivery, or at a later time. When the delivery is unattended, communication with the server would normally be performed when the buyer returns home (or other delivery location), or at a later time. However, verification could in principle happen prior to the buyer returning. For example, the buyer could ask a neighbor to verify delivery and execute a communication with the server to verify delivery.

Ways in which delivery verification can be achieved by the patron include, for example, communication of a secret password or code from the buyer to the patron at the time of delivery, wherein the secret password or code was issued to the buyer after the order was placed. In the case of attended delivery, the buyer can simply convey the secret password or code to the patron. In the case of unattended delivery, the secret password or code could be made available by written or other means to the patron at a pre-determined location, preferably (but not necessarily) either the same location as that selected as the specific placement location for the order, or a concealed location. Locations for communication of the secret password or code could include, for example, inside a door box, at a back door, on or near steps, near a mailbox, between a first and second door, inside a porch, under a placemat, in an artificial rock or other disguised container as is known, and the like. Through an e-mail, mobile-phone call or text message, or via the internet, the patron can then send the secret password or code to a server to verify delivery and close the transaction.

In some embodiments, a delivery time can be scheduled by the buyer, meaning either a specific delivery time or a range of delivery times. Imposing scheduling constraints may or may not affect delivery fees. Systems could optionally allow a buyer to indicate a willingness to pay more for delivery at certain times, or alternately, to pay less than a nominal amount for unscheduled delivery. Generally, the time or rate of delivery are not regarded as critical to the invention. Different system embodiments can be designed in various ways with respect to delivery speeds and times of day, each such embodiment within the scope of the appended claims.

In some embodiments of the methods and systems of the invention, a buyer can communicate feedback to a server to indicate level of satisfaction with the patron that delivered buyer's order. The collected feedback on a certain patron could be used in various ways, such as to determine whether said patron meets acceptable patron criteria of certain buyer, wherein that buyer's acceptable patron criteria comprises feedback that could be characterized as positive.

Various means of compensation could be utilized in various embodiments. For instance, a patron could be compensated by direct deposit into a bank account or onto a credit card. A patron could also be compensated by receiving store credit in some fashion. It is also possible that a patron would choose to waive direct compensation or to perform the service on behalf of his/her designated charity, such that the charity could receive a cash payment or credit. Some embodiments further include additional means of compensation beyond fees paid for delivery of specific orders, such as bonuses for certain numbers of deliveries, or positive feedback over a period of time, and the like.

A person of ordinary skill in the art will readily appreciate that the present invention need not be limited to deliveries from stores to buyers. It is envisioned that in certain embodiments, the server could accept "order" information from a first person ("buyer") and match the request with a second person ("patron") that can make a delivery of an item for the buyer, between any two locations within a local area. In these embodiments, essentially any items could be delivered, such as letters (as an alternative to mailing), used goods, goods traded or purchased using various internet-based methods, and so on. Preferably, the server system, databases, and methods used for such person-to-person delivery requests are the same server system, databases, and methods utilized for matching retail orders from buyers to patrons. However, a separate server and plurality of databases could be used.

Some embodiments of the invention will now be described by the following non-limiting examples, which are meant for illustration only.

EXAMPLES

Example 1

Online Order and Patron Delivery of a DVD Player

A buyer places an online order for a DVD player using a retail store's ordering system and selects to have the order delivered by Vertour™, which characterizes the service of the invention. The order is placed successfully, and the order information is sent to the Vertour server for processing. A transaction record is then created in the transaction database to track the status of the order. The server enters the order information into the order database, and updates the buyer database with the buyer information. The server then notifies the store that a new order is required to be packaged. The retail store's packaging employees package the order, and then notify the server that the packaging step is done and thus the order is ready to be delivered. With this information, the server updates the transaction database and marks the order as "packaged."

A patron is matched with this order for delivery by the following steps. The patron reviews pending orders at Vertour.com and selects this order, as it satisfies the patron's delivery and order criteria, and the patron wishes to deliver it. Furthermore, the patron is acceptable to the buyer, according to the buyer-specified acceptable patron criteria. The patron arrives at the retail store, fulfills his/her own shopping needs, and then proceeds to the retail store's pick-up counter with the order details. The retail store's employees load the patron's vehicle with the packaged DVD player, and the patron begins the delivery process. After unattended delivery, the buyer receives the DVD order.

Example 2

E-Commerce Order and Patron Delivery of Sporting Goods

A buyer browses a retail store's online shopping web site and places an order by telephone for goods, described on the shopping web site, consisting of a tennis racket, a basketball, and sports clothing. The information captured for the order includes the buyer's name and address, as well as a listing of said items the buyer wishes to purchase. The buyer's delivery address is sent to the Vertour server so that the server can determine if the service can be provided for this buyer. In this case, the service is available and can be selected. The buyer is given a choice between using the Vertour service or the prevailing service at a higher cost.

The buyer seeks to save money, as well as make an environmentally conscious delivery choice, and therefore chooses to use the Vertour service. The buyer accepts a Vertour service agreement. Next, the buyer confirms previously entered acceptable patron criteria that a patron must meet in order to be able to deliver the order. The buyer also specifies that unattended delivery is acceptable, for convenience, but that the delivery might be attended. The buyer provides instructions for a location at which the patron should leave the order, in case the buyer is not home.

The server system calculates a cost for the delivery. The factors used to determine this cost include how restrictive the buyer's patron criteria are. The buyer is given the chance to accept or reject the calculated delivery price. The price is accepted, and both the buyer's information and the order information are sent to the server. The server enters these two pieces of information into the buyer database and order database, respectively, and charges the buyer the amount of the order and the delivery. The server sends a confirmation e-mail to the buyer with the details of the order.

A patron, after doing some shopping, is interested in earning some extra money by making a few deliveries on the way home. The patron logs into an in-store kiosk and is quickly matched with the order described above for delivery, as well as two other orders to different buyers. The patron receives optimized travel instructions to minimize true travel cost. The patron then proceeds to deliver the two other orders, and makes an unrelated deviation and stop at a bank between the second and third orders, before the patron's final deviation comprising delivery of the tennis racket, a basketball, and sports clothing to the buyer. The buyer happens to be home to accept the order. The buyer is satisfied with the patron and the speed of delivery, as well as the delivery cost, and proceeds to send positive feedback to the server system.

Although illustrative embodiments and various modifications thereof have been described in detail herein, one skilled in the art will appreciate that the present application need not be limited to these precise embodiments and the described modifications, and that various changes and further modifications may be practiced without departing from the scope or spirit of the invention as defined in the appended claims. Other embodiments will be apparent to those of ordinary skill in the art, including embodiments that do not provide all of the features and advantages set forth herein. These other embodiments are also within the scope of this invention.

The invention claimed is:

1. A method of offering an opportunity for a patron to deliver at least one product to one or more buyers, the method comprising:
   (a) providing one or more products for delivery;
   (b) selecting the product or products by a buyer;
   (c) determining that delivery is available to a location specified by the buyer;
   (d) informing the buyer that delivery is available;
   (e) providing the buyer with an option to provide acceptable patron criteria;
   (f) calculating a delivery fee, if any, to the buyer;
   (g) accessing data comprising acceptable deviation criteria and acceptable order criteria;
   (h) matching at least one pending e-commerce order with the patron's acceptable delivery criteria, said acceptable delivery criteria including acceptable deviation criteria and acceptable order criteria;
   (i) providing the patron with the option to select for delivery one or more matched order of one or more buyers;
   (j) delivering the at least one order of the one or more buyers by the patron; and
   (k) determining and recording the compensation to the patron.

2. The method of claim 1, further comprising:
   (i) providing a user interface to allow the patron to create a valid account by choosing a user name and a password;
   (ii) providing a user interface to allow the patron to specify acceptable delivery criteria;
   (iii) presenting a service agreement between the patron and the service provider, wherein the service agreement can be acknowledged by the patron;
   (iv) verifying the legal eligibility of the patron to participate in the method of claim 1; and
   (v) adding the information provided by the patron in steps (ii)-(iv) to a database.

3. The method of claim 1, wherein the acceptable deviation criteria include at least the criterion that (i) the additional distance of travel required by the deviation is less than a preset limit, (ii) the additional time of travel required by the deviation is less than a preset limit, or both criteria (i) and (ii).

4. The method of claim 1, wherein the acceptable order criteria include at least the criterion that (i) the total weight of the goods in the order is less than a preset limit, (ii) the total volume of the goods of the order is less than a preset limit, or both criteria (i) and (ii).

5. The method of claim 1, further comprising:
   (i) providing a user interface to allow the patron to login;
   (ii) retrieving patron's acceptable delivery criteria;
   (iii) retrieving one or more pending orders;
   (iv) applying patron's delivery criteria to filter the pending orders in substep (iii);
   (v) providing a user interface to present to the patron the orders, if any, that satisfy the patron's delivery criteria;
   (vi) providing a user interface to allow the patron to accept or decline the order or orders from substep (v);
   (vii) when at least one order is accepted in substep (vi), providing a user interface to communicate to the patron the set of order or orders to deliver, driving directions and/or a map, and estimated travel time.

6. The method of claim 1, further comprising:
   (i) creating a record in a database upon receiving of the order, with an indication that the order is not yet packaged;
   (ii) updating the order status to indicate it is packaged, upon completion of order packaging;
   (iii) updating the order status to indicate that it has been selected by a patron to deliver, upon patron's confirmation;
   (iv) updating the order status to indicate that the order has been carried out of a store and is being delivered;
   (v) adding a delivery fee to the patron's account; and
   (vi) updating the order status to indicate it has been delivered, thereby closing the transaction.

7. The method of claim 1, further comprising:
   (i) creating a record in a database upon receiving of the order;
   (ii) indicating to the buyer that the order is authorized to be picked up by a patron;
   (iii) viewing the pending order by a potential patron;
   (iv) selecting the order for delivery by the patron;
   (v) updating the order status to indicate it has been delivered to the buyer; and
   (vi) adding a delivery fee to the patron's account.

8. The method of claim 1, further comprising:
   (i) providing a user interface to the buyer to show whether delivery by a patron is available to buyer's address;
   (ii) when delivery by a potential patron is available, presenting a service agreement to the buyer;
   (iii) providing a user interface to the buyer to allow the buyer to input acceptable patron criteria;
   (iv) calculating a delivery fee based on buyer-specified patron criteria; and
   (v) adding information obtained from substeps (i)-(iv) into a database.

9. The method of claim 8, wherein the acceptable patron criteria include at least one or more criteria that (i) the number of deliveries performed by the patron over a certain time period is more than a preset limit, (ii) the number or percentage of positive feedback scores of the patron is more than a preset limit, (iii) the patron is characterized by positive feedback according to at least one third-party ratings system, or (iv) the patron is within a certain number of people connections to the buyer.

10. The method of claim 1, wherein the patron delivers orders to two or more buyers, wherein each order meets the patron's acceptable order criteria and each buyer meets the patron's acceptable deviation criteria, and wherein the set of orders as a whole meets the patron's acceptable delivery criteria.

11. The method of claim 1, wherein the patron delivers two or more e-commerce orders placed by two or more buyers.

12. A method of selling one or more products and delivering the products to a buyer, the method comprising:
 (a) providing the one or more products;
 (b) electronically purchasing the product(s) by the buyer;
 (c) providing the option of delivery by a patron to the buyer;
 (d) determining at least one potential patron for delivery of the product(s) to the buyer;
 (e) determining, for each potential patron, the delivery deviation associated with the buyer;
 (f) comparing the delivery deviation from step (e) with acceptable deviation criteria of each potential patron; and
 (g) if at least one patron is associated with deviation criteria that is acceptable, selecting one patron, authorizing the delivery transaction, and compensating said patron for delivery of the products to the buyer.

13. The method of claim 12, further comprising:
 (i) providing a user interface to allow the patron to create a valid account by choosing a user name and a password;
 (ii) providing a user interface to allow the patron to specify acceptable delivery criteria;
 (iii) presenting a service agreement to the patron;
 (iv) verifying the legal eligibility of the patron to deliver the product(s); and
 (v) adding the information provided by the patron in steps (ii)-(iv) to a database.

14. The method of claim 12, further comprising:
 (i) providing a user interface to allow the patron to login;
 (ii) retrieving patron's acceptable delivery criteria;
 (iii) retrieving one or more pending orders;
 (iv) applying the patron's delivery criteria to filter the pending orders in substep (iii);
 (v) providing a user interface to present to the patron the orders, if any, that satisfy the patron's delivery criteria;
 (vi) providing a user interface to allow the patron to accept or decline the order or orders from substep (v);
 (vii) when at least one order is accepted in substep (vi), providing a user interface to communicate to the patron the set of order or orders to deliver, driving directions and/or a map, and estimated travel time.

15. The method of claim 12, further comprising:
 (i) creating a record in a database upon receiving of the order, with an indication that the order is not yet packaged;
 (ii) updating the order status to indicate it is packaged, upon completion of order packaging;
 (iii) updating the order status to indicate that it has been selected by a patron to deliver, upon patron's confirmation;
 (iv) updating the order status to indicate that the order has been carried out of a store and is being delivered;
 (v) adding the delivery fee to the patron's account; and
 (vi) updating the order status to indicate it has been delivered, thereby closing the transaction.

16. The method of claim 12, further comprising:
 (i) providing a user interface to the buyer to show whether delivery by a potential patron is available to buyer's address;
 (ii) when delivery by a potential patron is available, presenting a service agreement to the buyer;
 (iii) providing a user interface to allow the buyer to input acceptable patron criteria;
 (iv) calculating a delivery fee based on buyer-specified patron criteria; and
 (v) adding information obtained from substeps (i)-(iv) into a database.

17. An e-commerce system for offering, over a network, an opportunity for a patron to deliver one or more e-commerce orders to at least one buyer, the system comprising:
 at least one server computer configured to exchange data with a plurality of client computers;
 said server computer having a processor, an area of main memory for executing program code under the direction of the processor,
 a storage device for storing data and program code and a bus connecting the processor, main memory and the storage device;
 the code being stored in said storage device and executing in said main memory under the direction of said processor, to perform the steps of:
 (a) providing one or more products for delivery;
 (b) selecting the product or products by a buyer;
 (c) determining that delivery is available to a location specified by the buyer;
 (d) informing the buyer that delivery is available;
 (e) providing the buyer with an option to provide acceptable patron criteria;
 (f) calculating a delivery fee, if any, to the buyer;
 (g) accessing data comprising acceptable deviation criteria and acceptable order criteria;
 (h) matching at least one pending e-commerce order with the patron's acceptable delivery criteria, said acceptable delivery criteria including acceptable deviation criteria and acceptable order criteria;
 (i) providing the patron with the option to select for delivery one or more matched order of one or more buyers;
 (j) delivering the at least one order of the one or more buyers by the patron; and
 (k) determining and recording the compensation to the patron.

18. The system of claim 17, wherein the network is the Internet.

19. The system of claim 17, wherein the storage device is physically contained in a retail store in which the buyer places an order.

* * * * *